United States Patent [19]

Morris

[11] Patent Number: 5,232,013

[45] Date of Patent: Aug. 3, 1993

[54] CHECK VALVE WITH POPPET DAMPING MECHANISM

[75] Inventor: Brian G. Morris, Houston, Tex.

[73] Assignee: The United States of America as represented by the Administrator of the National Aeronautics and Space Administration, Washington, D.C.

[21] Appl. No.: 902,266

[22] Filed: Jun. 22, 1992

[51] Int. Cl.⁵ .................................. F16K 15/06
[52] U.S. Cl. ................................... 137/514.7
[58] Field of Search ............... 137/514, 514.5, 514.7

[56] References Cited

U.S. PATENT DOCUMENTS

| | | | |
|---|---|---|---|
| 1,003,413 | 9/1911 | Ballard | 137/514.7 |
| 1,754,975 | 4/1930 | Anderson | 137/514.5 |
| 2,318,962 | 5/1943 | Parker | 137/514.5 |
| 2,969,085 | 1/1961 | Nystrom | 137/514.7 |
| 3,605,802 | 9/1971 | Hertell | 137/514.5 |
| 3,756,273 | 9/1973 | Hengesbach | 137/540 |

FOREIGN PATENT DOCUMENTS 0333526 2/1989 France .

Primary Examiner—Robert G. Nilson
Attorney, Agent, or Firm—Russell E. Schlorff; Guy M. Miller; Edward K. Fein

[57] ABSTRACT

An inline check valve for a flow line where the valve element is guided for inline travel forward and rearward of a valve sealing member and is spring biased to a closed sealing condition. One of the guides for the valve element includes a dashpot bore and plunger member to control the rate of travel of the valve element in either direction as well as provided a guiding function. The dashpot is not anchored to the valve body so that the valve can be functional even if the plunger member becomes jammed in the dashpot.

6 Claims, 1 Drawing Sheet

CHECK VALVE WITH POPPET DAMPING MECHANISM

ORIGIN OF THE INVENTION

The invention described herein was made by an employee of the United States Government and may be manufactured and used by or for the Government of the United States of America for government purposes without the payment of any royalties thereon or therefor.

RELATED APPLICATION

This application is related to a co-pending application by the same inventor, Ser. No. 07/902,265, filed Jun. 22, 1992 and entitled: "Check Valve with Dashpot/Frictional Damping Mechanism".

FIELD OF THE INVENTION

This invention relates to check valves for fluid flow lines, and more particularly, to spring loaded, inline check valves with a poppet damping mechanism and to other valves where valve seating forces are light and the sealing of a valve member on a valve seat is assisted by a spring, a pneumatic actuator or gravity forces.

BACKGROUND OF THE INVENTION

Check valves are commonly used in numerous military and aerospace operations where dependable sealing and operating functions are required under demanding conditions. In typical check valves, a spring loaded valve member is located on a common longitudinal axis in a valve body or valve housing between an inlet port and an outlet port. A floating "O" ring seal on the valve member can be disposed between a metal sealing surface on the valve member and a valve seat in the valve body to cushion closing of the valve and to insure perfect sealing. Fluid under pressure in the inlet port will push the valve member to an open position when the pressure exceeds or overcomes the closing force of the spring acting on the valve member and flow in one direction through the valve. In the absence of sufficient pressure in the inlet port or a fluid pressure causing a fluid flow in a reverse direction, the closing force of the spring moves the valve member to a closed condition where the "O" ring seal prevents fluid flow. The valve member is arranged relative to the valve housing to compress the "O" ring sufficiently to engage the metal sealing surfaces of the valve member and the valve body. The valve member is arranged to have a metal-to-metal contact with the valve housing to prevent extrusion of the "O" ring with an excess pressure differential in a reverse direction. The valve member also has a longitudinally extending guide extension slidably received in a guide bore in the valve housing to guide the valve member for motion along the longitudinal axis of the valve housing when the valve member moves between an open and a closed condition.

Because of the spring and the mass of the valve member, certain flow velocities of fluid though the valve can cause a harmonic motion of the valve member which occurs at a natural frequency of the valve member. Over a period of time, such a harmonic motion accelerates the wear of the guide extension in the guide bore. The wear, in turn, leads to valve failure. This is a common effect in gaseous fluid service and can ruin a valve in a matter of hours in some instances.

The harmonic motion of a valve member can also introduce an undesirable disturbance in the consistency of fluid flow through the valve.

The wear of the guide extension and the guide bore also increases the clearance space between these two parts so that the valve member can tip or wobble about its longitudinal axis. This action accelerates the wear on the guide extension and the guide bore and can ultimately cause the valve member to jam thus fail.

The accelerated wear of a valve member also can cause particulate matter to be generated and introduced into the fluid flow which can be deleterious where fluid contaminates are not tolerated.

Thus, a check valve can have regions of operating instability which a user must avoid because the vibration of the valve element during operation.

In pressure regulators sometimes a damper is incorporated in the form of a bellows-sealed chamber that breathes through one or more orifices as it is forced to change volume by motion of the valve member. In this type of system, the bellows is not very effective for damping and has a limited life. Small breather orifices are also subject to contamination or plugging in use.

PRIOR PATENT ART

U.S. Pat. No. 3,756,273 issued on Sep. 4, 1973 to R. W. Hengesbach discloses a check valve which is self cleaning and relates to an "O" ring location. The valve has a frustoconical sealing surface and a frusto-conical valve element with an "O" ring in a seating groove. The "O" ring centers the valve element and provides the valve seal. The poppet is supported for axial movement toward and away from the seating surface and can float slightly in relation to the seating surface so that precise alignment is not necessary for seating. The patent shows a valve member which has extensions on either side of a valve member for guiding the valve elements.

European patent No. 333-526-A dated Feb. 3, 1989 and issued to D. Daniel discloses a delayed closure valve. A piston (2) has a calibrated orifice (6) through which water passes at a predetermined rate thus regulating the closure of the valve.

SUMMARY OF THE PRESENT INVENTION

The check valve of the present invention includes a valve housing with an inline flow passage having inline inlet and outlet ports. A centrally located circular valve seat is located within the valve housing and is disposed about a longitudinal axis of the flow passage. Guide means are located in the valve housing at locations fore and aft of the valve seat. A valve member has fore and aft guide members slidably disposed in the guide means to provide for guiding of said valve member with respect to the longitudinal axis when the valve member is moved between a closed condition and an open position relative to the valve seat. In a closed condition, the valve member has an elastomer O-ring arranged to seal under compression between the valve seat and the valve member under the resilient bias of a spring member. The valve member also has a stop flange in the valve body to limit compression of the O-ring and to prevent extrusion in the event of back pressure.

One of the guide means has a tubular bypass housing which movably receives a closed end dashpot member and permits fluid to flow around or bypass the dashpot member. The valve member has a guide extension movably received in the open end of the dashpot member. The spring member is disposed between the dashpot member and the valve member so that the spring member positions the valve member and dashpot member in an extended condition where the dashpot member engages a stop flange in the bypass housing and the valve member compresses the O-ring on the valve seat. When fluid flows in a forward direction, the spring member is compressed to a contracted condition as the guide extension of the valve member moves into the dashpot member. The guide extension is provided with an annular clearance with respect to the bore of the dashpot member so that the trapped fluid in the dashpot member exits through the annular clearance and produces a damping function of the guide extension relative to the dashpot member.

DESCRIPTION OF THE PRESENT INVENTION

Figure 1:
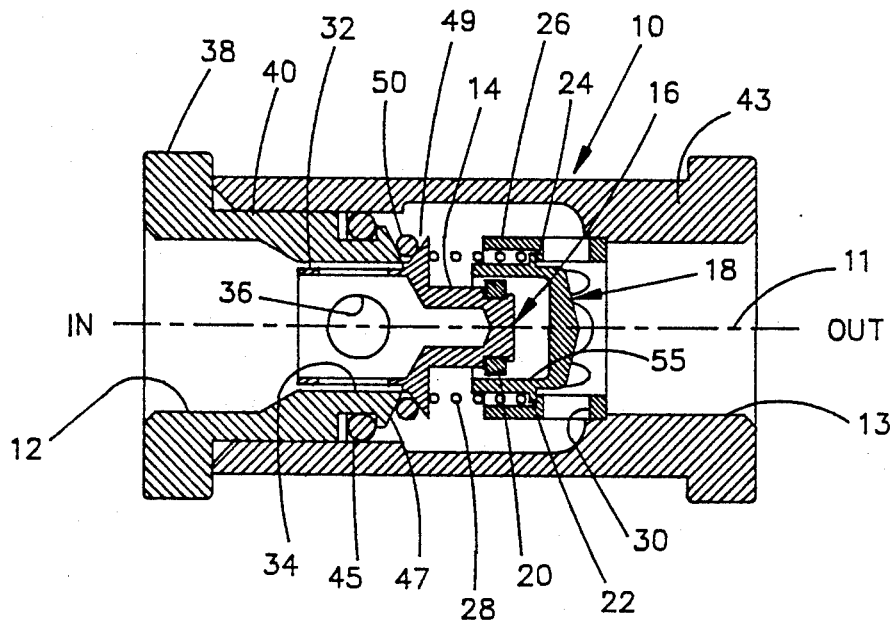
FIG. 1 is a view in longitudinal cross-section illustrating a check valve embodying the present invention and shown in a closed position.
Figure 2:
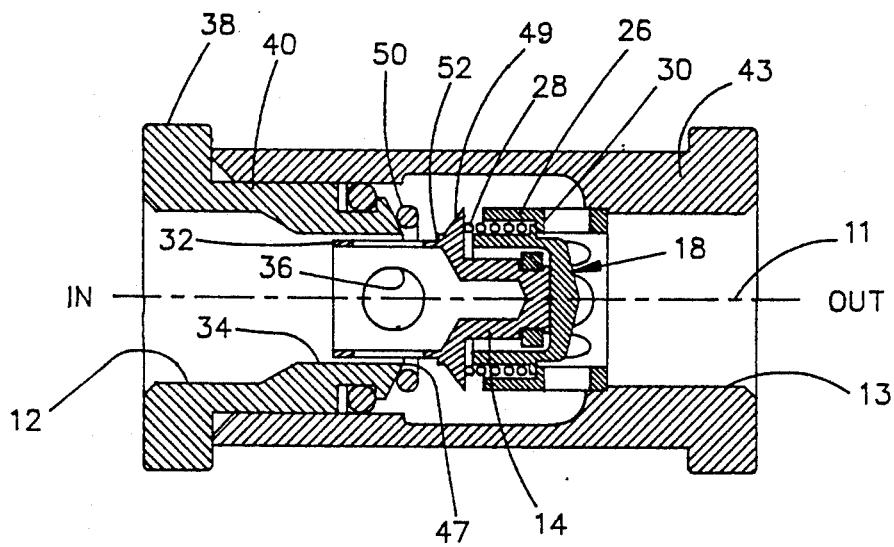
FIG. 2 is a view in longitudinal cross-section illustrating a check valve embodying the present invention and shown in a open position.

Referring now to FIGS. 1 and 2, the valve of the present invention includes a tubular valve body or valve housing 10 which extends along a longitudinal axis 11 and has an in-line inlet port 12 and an outlet port 13. A poppet or valve member 14 is slidably arranged in the housing 10 for movement along the longitudinal axis 11. The valve member 14 has a forward guide extension 16 which is movably disposed within the open end of a closed dashpot member 18. An annular clearance ring 20 is received in an annular groove on the guide extension 16 and forms a dashpot plunger in the dashpot member. The clearance ring 20 or dashpot plunger is slidable within the dashpot member 18 but has an annular clearance space with respect to the bore of the dashpot member 18.

Figure 4:
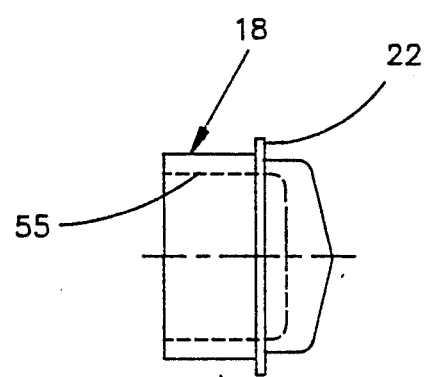
FIG. 4 is a side view of the dashpot member in the valve.

The dashpot member 18 has an outer flange 22 (See FIG. 4) arranged to engage an internal flange 24 on a tubular bypass housing member 26. The internal flange 24 is formed by a counterbore in the housing member 26. A spring member 28 is disposed in the annular space between the dashpot member 18 and the counterbore in the housing member 26. The spring member 28 is in compression between the dashpot flange 22 and a transverse surface on the valve member 14. The bypass housing member 26 is attached or fixed in a counterbore located in the housing 10. The bypass housing member 26 has circumferentially arranged ports 30 located so that fluid flow can bypass the dashpot member 18.

The valve member 14 has a tubular guide extension 32 disposed in a guide bore 34 of the housing 10. The tubular guide extension 32 has circumferentially arranged openings 36 to permit fluid bypass flow. The guide extension 32 and the guide bore 34 have a sufficient annular clearance space to permit a sliding motion yet provide a guide means for the valve member 14.

The valve housing 10 can be in two interfitting tubular parts 38,43 where one part 38 of the valve housing 10 has a tubular portion 40 located within the tubular end of the other part 43 of the valve housing. An "O" ring 45 in an O-ring groove in the part 38 seals the parts 38 and 43 relative to one another. The parts 38 and 43 can be threadedly connected or coupled together in any suitable manner.

The valve has sealing means which includes a frustoconical sealing surface 47 on the housing part 38, a frustoconical sealing surface 49 on the valve member 14 and an "O" ring 50. A facing surface about the bore of the tubular portion 40 at the end of the sealing surface 47 provides a stop which can engage a shoulder 52 on valve member 14 and prevent extrusion of the "O" ring 50.

Figure 3:
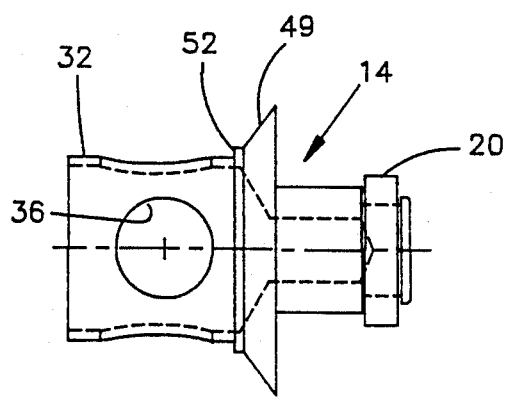
FIG. 3 is a side view of the valve element for the valve.

As described above, the spring member 28 is disposed in compression between the valve member 14 and the dashpot member 18. The spring member 28 assures that the O-ring 50 sealingly engages the frusto-conical surfaces 47 and 49. Compression of the O-ring 50 is limited by engagement of a stop surface 52 (See FIG. 3) on the valve member 14 with the facing surface about the bore of the tubular portion 40.

When a pressure differential occurs across the valve member 14 due to fluid flow into the inlet port 12, the valve member 14 is shifted longitudinally toward the outlet port 13 and the fluid flow moves through the openings 36, the valve body and the ports 30 to the outlet port 13. As illustrated, the bypass housing member 26 is located in an enlarged cavity in the valve housing and the open area of the ports 30 is made as large as possible to avoid restriction of fluid flow. When the valve member 14 is shifted (and the valve is opened), the spring member 28 is compressed and the guide extension 16 and the clearance ring 20 move within the closed bore 55 of the dashpot member 18. Thus, the guide extension 16 and the clearance ring 20 in the bore 55 of the dashpot member 18 provide a guide means for the valve member 14.

As described above, the valve member 14 has guide members in the guide bore 34 of the valve housing 10 and in the guide bore 55 of the dashpot member 18. Since the dashpot member 18 is closed at one end, when the guide extension 16 and the clearance ring 20 are moved axially within the dashpot member 18, fluid flow will either into or out of the open end of the dashpot member 18 depending upon the direction of movement of the valve member. With a selected clearance or annular space between the clearance ring 20 and the bore 55 of the dashpot member 18, the rate of movement of the valve member 14 between open and closed conditions can be controlled. By controlling the rate of movement with a dashpot or damping action, harmonic frequency vibration of the valve member can be avoided. Also the guide extension does not contact the guide bore so there is no friction. Controlling the rate of movement by the fluid flow through the clearance space stabilizes the position of guide extension 16 in the dashpot bore 55 and controls the rate of movement of the valve member 14 in both directions. The clearance ring 20 does not prevent fluid flow but rather controls the fluid flow.

The clearance ring 20 can be made of Teflon (a trademark of DuPont) or other material which has a characteristic low coefficient of friction and pliability sufficient so as to avoid locking up if particulate enters the bore. It should have sufficient hardness to avoid acting as a pressure seal such as an elastomer O-ring.

If the valve member 14 somehow becomes locked or jammed in the dashpot member 18 by particulate matter, the valve still functions as check valve because flow in a reverse direction will still close the valve member 14 by compressing the O-ring 50 on the valve seating surface 47. This prevents reverse flow and only the self closing action of the spring member is lost. This closing movement can occur because the dashpot member 18 is not anchored to the valve body member. Thus, the valve can still function to open and close although the spring closure force is lost.

The dashpot member 18 and the clearance ring 20 dampen the rate of movement of the valve member 14 in response to pressure variations so that harmonic motions are not developed. Tipping of the valve member relative to the longitudinal axis of the valve member is prevented because of the forward and rearward ends of the valve member are guided in guide means.

It will be apparent to those skilled in the art that various changes may be made in the invention without departing from the spirit and scope thereof and therefore the invention is not limited by that which is disclosed in the drawings and specifications but only as indicated in the appended claims.

I claim:

1. A check valve with an inlet and outlet arranged on a common longitudinal axis for use in a flow line and including:
 a valve body having a passageway extending along said longitudinal axis between said inlet and said outlet and having a valve seat along said passageway;
 means defining guide bores in said valve body along said longitudinal axis on either side of said valve seat;
 a valve member disposed in said guide bores and arranged for longitudinal movement between a closed position on said valve seat in said valve body and an open position displaced from said valve seat, said valve member having guide elements respectively movably disposed in said guide bores for guiding said valve member between said closed position and said open position;
 one of said means defining guide bores having a closed end to form an open ended dashpot chamber which receives one of said guide elements, a dashpot plunger element on said one of said guide elements, said plunger element having an annular clearance space relative to said dashpot chamber for controlling the rate of travel of said plunger element relative to said dashpot chamber, said plunger element having an annular ring constructed from Teflon material having a low coefficient of friction and sufficient hardness to resist sealing with respect to said dashpot chamber whereby said valve member is shiftable between said closed and said open position at a controlled rate of speed as a function of the clearance space.

2. The check valve as set forth in claim 1 wherein said valve body has bypass means for bypassing fluid around said housing member.

3. A check valve with an inlet and an outlet arranged on a common longitudinal axis for use in a flow line and including:
 a valve body having a passageway extending along said longitudinal axis between said inlet and outlet;
 a dashpot housing member slidably disposed in said valve body, said dashpot housing member having a closed end and an open end;
 means for providing a stop position for said dashpot housing member relative to said valve body in one direction of fluid flow through said valve;
 a valve seat in said valve body, said valve seat being disposed about said longitudinal axis;
 a valve member disposed in said valve body having valve sealing means and being movable longitudinally between a closed position on said valve seat and an open position relative to said valve seat;
 spring means disposed between said housing member and said valve member for normally urging said sealing means to a closed position and said housing member to its stop position in the valve body; and
 means for controlling the rate of movement of said valve member between said open position and said closed position including a dashpot plunger element slidably received in the open end of said housing member.

4. The valve as set forth in claim 3 and further including means disposed between said inlet and said valve seat for guiding movement of said valve member between said open and said closed position along said longitudinal axis.

5. The valve as set forth in claim 4 wherein said dashpot plunger element is an annular ring constructed from Teflon material and having a clearance space with respect to said housing member.

6. A check valve with an inlet and outlet arranged on a common longitudinal axis for use in a flow line and including:
 a valve body having a passageway extending along said longitudinal axis between said inlet and said outlet and having a valve seat along said passageway;
 means defining guide bores in said valve body along said longitudinal axis on either side of said valve seat;
 a valve member disposed in said guide bores and arranged for longitudinal movement between a closed position on said valve seat in said valve body and an open position displaced from said valve seat, said valve member having guide elements respectively movably disposed in said guide bores for guiding said valve member between said closed position and said open position;
 one of said means defining guide bores having a closed end to form an open ended dashpot chamber which receives one of said guide elements, a dashpot plunger element on said one of said guide elements, said plunger element having an annular clearance space relative to said dashpot chamber for controlling the rate of travel of said plunger element relative to said dashpot chamber, said plunger element being constructed from a material having a low coefficient of friction and sufficient hardness to resist sealing with respect to said dashpot chamber whereby said valve member is shiftable between said closed and said open position at a controlled rate of speed as a function of the clearance space; and
 said dashpot chamber being formed from an independent external housing member disposed in said valve body, said housing member having external flange for engaging a stop wall int eh valve body and for engaging a spring member disposed between said flange member and said valve member.

* * * * *